United States Patent
Ulhasrao Deshmukh et al.

(10) Patent No.: US 12,112,153 B2
(45) Date of Patent: Oct. 8, 2024

(54) ENVIRONMENT ESTABLISHMENT FOR A PROGRAM IN A SERVER SYSTEM

(71) Applicant: HEWLETT PACKARD ENTERPRISE DEVELOPMENT LP, Houston, TX (US)

(72) Inventors: Minal Ulhasrao Deshmukh, Karnataka (IN); Suveer Nagendra, Karnataka (IN); Senthil Kumar Thimmappa, Karnataka (IN); Gouthami Kolla, Karnataka (IN); Rajesh Ranganathan, Karnataka (IN); Madhusuthanan Vikramaboopathi, Karnataka (IN); Prakash Maiya, Karnataka (IN); Siddhartha Gudgunti, Karnataka (IN); Ankan Shrivastava, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/588,400

(22) Filed: Jan. 31, 2022

(65) Prior Publication Data

US 2023/0244464 A1    Aug. 3, 2023

(51) Int. Cl.
G06F 9/445     (2018.01)
G06F 8/60      (2018.01)
H04L 67/00     (2022.01)

(52) U.S. Cl.
CPC ............. G06F 8/60 (2013.01); H04L 67/34 (2013.01)

(58) Field of Classification Search
CPC ........................................... G06F 8/60
USPC ............................................. 717/177
See application file for complete search history.

(56) References Cited

U.S. PATENT DOCUMENTS

| | | | |
|---|---|---|---|
| 7,516,206 B2 * | 4/2009 | Henseler .................. | G06F 8/63 709/201 |
| 8,510,600 B2 * | 8/2013 | Broda ................. | G06F 11/0793 714/25 |
| 8,776,044 B1 * | 7/2014 | Vaidya .................... | H04L 63/20 717/171 |
| 8,959,490 B2 * | 2/2015 | Gupta ................. | G06F 11/3466 717/130 |
| 9,450,820 B2 | 9/2016 | Birk et al. | |

(Continued)

OTHER PUBLICATIONS

Google Cloud "Configuring your App with app.yaml," https://cloud.google.com/appengine/docs/flexible/custom-runtimes/configuring-your-app-with-app-yaml, Oct. 14, 2021, pp. 14.

(Continued)

*Primary Examiner* — Evral E Bodden
(74) *Attorney, Agent, or Firm* — Trop, Pruner & Hu, P.C.

(57) ABSTRACT

In some examples, a system receives, from a requesting entity, input information relating to a program to be deployed on a server system. The system establishes, based on the input information, an environment in the server system, where the environment is based on interaction with a subsystem of the server system, the subsystem of the server system to support one or more of fault tolerance for the program or scalability of the program in the server system. After establishing the environment of the subsystem of the server system, the system sends response information to the requesting entity, the response information useable by the requesting entity to manage the program when executed in the server system.

19 Claims, 4 Drawing Sheets

(56) References Cited

U.S. PATENT DOCUMENTS

| | | | |
|---|---|---|---|
| 9,547,482 | B2 | 1/2017 | Soffer et al. |
| 9,577,998 | B2* | 2/2017 | Natarajan ............. H04L 67/568 |
| 10,360,025 | B2 | 7/2019 | Foskett et al. |
| 10,389,582 | B1 | 8/2019 | Fakhouri et al. |
| 10,785,128 | B1 | 9/2020 | Bawcom |
| 10,884,732 | B1 | 1/2021 | Zolotow et al. |
| 10,942,724 | B2* | 3/2021 | Spivak ...................... G06F 8/71 |
| 11,003,423 | B2 | 5/2021 | Mazurskiy |
| 11,582,101 | B2* | 2/2023 | Cartes ................... H04L 41/082 |
| 2005/0005018 | A1* | 1/2005 | Datta .................. H04L 67/1001 |
| | | | 709/208 |
| 2006/0197967 | A1* | 9/2006 | Snover ................ G06F 9/45512 |
| | | | 358/1.13 |
| 2011/0302399 | A1* | 12/2011 | Dubinsky ............. G06F 9/4401 |
| | | | 713/2 |
| 2013/0067448 | A1* | 3/2013 | Sannidhanam ........... G06F 8/60 |
| | | | 717/169 |
| 2015/0244585 | A1 | 8/2015 | Birk et al. |
| 2016/0253103 | A1* | 9/2016 | Foley ................. G06F 12/0276 |
| | | | 711/154 |
| 2019/0042603 | A1 | 2/2019 | Park et al. |
| 2019/0196435 | A1* | 6/2019 | Song ..................... G06F 11/203 |

OTHER PUBLICATIONS

Martinelli, R., "Introduction to Terraform," https://ruanmartinelli.com/posts/introduction-to-terraform, Nov. 17, 2020, pp. 7.

Microsoft, "Create a .NET Core application with plugins," https://docs.microsoft.com/en-us/dotnet/core/tutorials/creating-app-with-plugin-support, Sep. 15, 2021, pp. 13.

* cited by examiner

ENVIRONMENT ESTABLISHMENT FOR A PROGRAM IN A SERVER SYSTEM

BACKGROUND

A server system can execute various programs. The programs executed on a server system may be accessible by a user from a remote client device. Programs can include application programs, operating systems, and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A server system on which programs can be deployed can have various features that may improve the performance of programs. As used here, the term "program" can refer to machine-readable instructions, such as software or firmware, that can execute in a computer system. A "server system" can refer to a computer system that can be accessed from client devices. A "computer system" can refer to a single computer or multiple computers. A "client device" can refer to a computer such as a desktop computer, a notebook computer, a tablet computer, a smartphone, and so forth.

Examples of features of a server system that may improve the performance of a program executing on the server system can include fault tolerance, scalability, and so forth. Fault tolerance refers to a program being able to survive a failure in the server system. For example, the server system may employ a backup process or a redundant processor for a program that executes in the server system. In case of failure of a primary process for the program, the backup process or the redundant processor can take over operation of the program. Data integrity can be maintained during the failover from the primary process of the program to the backup process or the redundant processor, so that no data is lost or corrupted.

Scalability can refer to deploying multiple instances of a program across multiple processors in the server system. In some examples, the server system can support scale-up or scale-down of instances of a program across multiple processors of the server system without having to perform a system restart. Scaling up instances of a program refers to executing additional instances of the program on more processors. Scaling down instances of the program refers to reducing the number of instances of the program on processors. Scaling up or scaling down instances of a program can be performed manually or automatically.

Elasticity of a program is supported if scalability is supported. Elasticity refers to the ability of the server system to automatically launch additional instances of a program as the load on existing instances of the program increase.

In other examples, the server system can support other features for programs executed in the server system.

A developer of a program may not be familiar with configuration details of the server system that support various features (e.g., fault tolerance, scalability, etc.) available in the server system. As a result, the developer may not be able to easily customize the program to take advantage of the features offered by the server system, without having to first learn about how the program can be modified to support the features of the server system. Having to learn details of the server system prior to deploying a program on the server system can add to the amount of time and effort involved in deploying the program on the server system. Additionally, the developer of the program may have to rely on an outside expert to understand how the developer can customize the program to leverage features available in the server system.

In accordance with some implementations of the present disclosure, techniques or mechanisms are provided to manage deployment of a "legacy" program on a server system that has subsystems to support various features, such as any or some combination of fault tolerance and scalability for the program. Program developers that are agnostic of configuration details of the server system can provide input information relating to the legacy program to be deployed, and a plugin or other module is able to establish an environment in the server system to support fault tolerance and/or scalability of the legacy program once deployed on the server system.

A "legacy program" can refer to a program that has not been customized for specific features (e.g., fault tolerance and/or scalability) of the server system.

Figure 1:
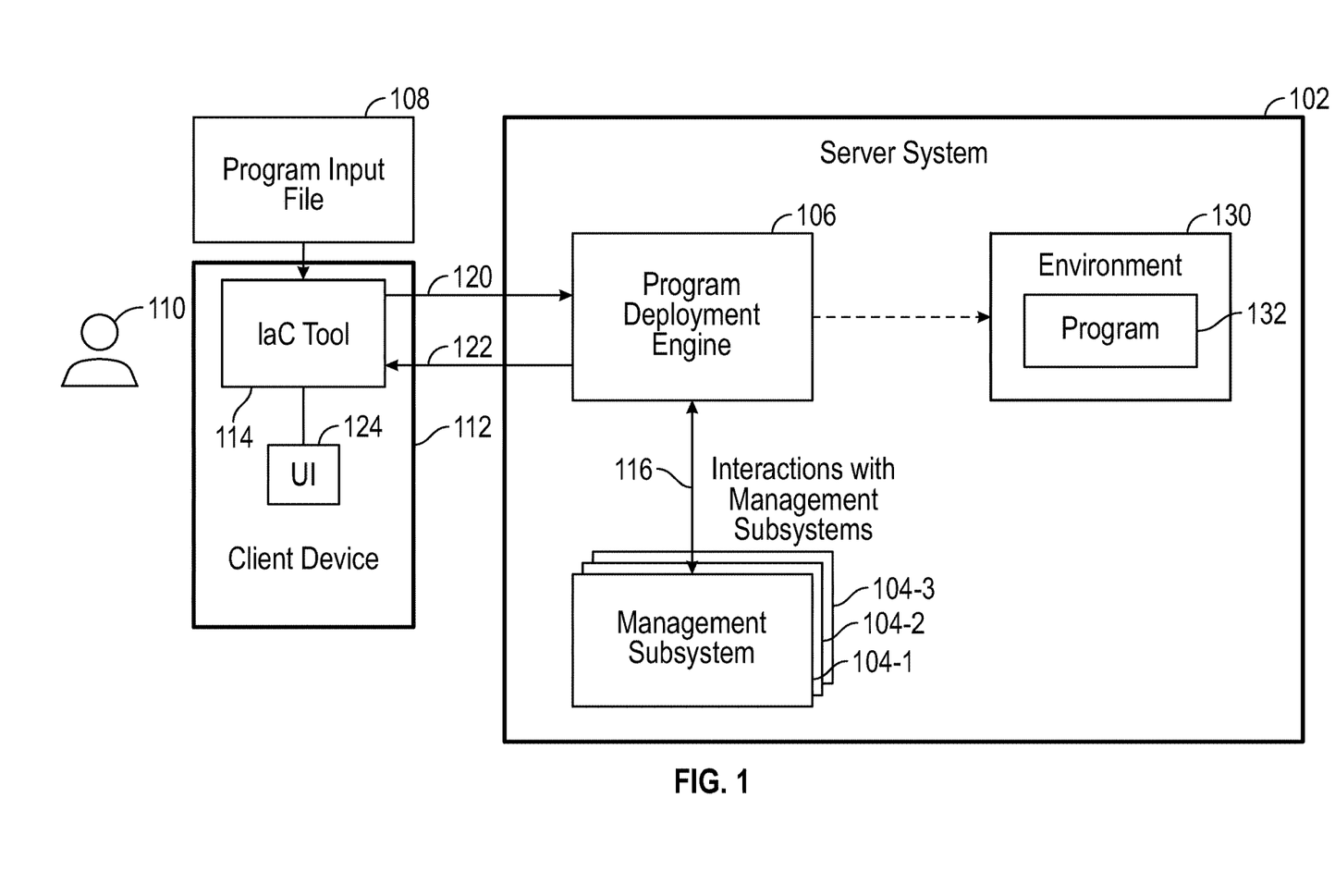
FIG. 1 is a block diagram of an arrangement that includes a program deployment engine according to some examples.

FIG. 1 is a block diagram of an example arrangement that includes a server system 102 that includes various management subsystems 104-1, 104-2, and 104-3. The different management subsystems 104-1 to 104-3 are used to perform different functionalities.

For example, the management subsystem 104-1 can be used to configure and manage a status of the components in the server system 102, such as a network interface controller, a storage subsystem, and so forth. The management subsystem 104-2 can be used for managing connectivity to a database. The management subsystem 104-3 can be used to manage fault tolerance and scalability for programs.

Although specific examples of management subsystems are listed, it is noted that in further examples, additional or different management subsystems may be present in the server system 102.

Generally, each management subsystem can provide a feature (or multiple features) that can be employed when a program is executed in the server system 102.

A developer of a legacy program may not be familiar with the specific features of the server system 102, and thus would not be able to customize the program to leverage the specific features of the server system 102. In some examples of the present disclosure, the server system 102 includes a program deployment engine 106 that is able to receive input information relating to a program (132) to be deployed in the server system 102, and to interact with the management subsystem(s) 104-1 to 104-3 for the purpose of setting up an environment 130 in the server system 102 to allow the program 132 to use the specific features of the server system 102 (e.g., fault-tolerant and/or scalability). The "environment" refers to any collection of settings in the server system, which can be managed by the management subsystems 104-1 to 104-3, where the settings can correspond to specific features to be provided to the program 132, such as fault tolerance and/or scalability. The settings can specify that the features are to be provided, and the management subsystems 104-1 to 104-3 can use such settings to control the provision of the features.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

Although FIG. 1 shows the program deployment engine 106 as being part of the server system 102, in other examples, the program deployment engine 106 can be external of the server system 102.

In some examples, the program deployment engine 106 can be implemented as a plug-in to the server system 102. A plug-in refers to machine-readable instructions that are added as an extension to the server system 102 to provide functionality that is not originally part of the server system 102. In other examples, the program deployment engine 106 can be implemented with a different type of module.

Although the program deployment engine 106 is depicted as a singular engine, it is noted that in some examples, multiple instances of the program deployment engine 106 (e.g., multiple plug-ins) may be present in the server system 102, such as to interact with respective ones of the management subsystems 104-1 to 104-3.

In accordance with some examples of the present disclosure, a developer of a program 132 to be deployed on the server system 102 does not have to learn configuration details of the server system 102 to employ the specific features of the server system 102.

Instead, the developer can provide input information related to the program 132 to be used by the program deployment engine 106 to establish the environment 130 in the server system 102 so that the program 132 in the environment 130 can use the specific features of the server system 102 when the program is executed in the server system 102.

In some examples, the input information related to the program 132 can be included in a program input file 108. As used here, the term "file" can refer to a single file or multiple files, where a "file" can refer to any type of information container.

The program input file 108 may be created by a user 110 (e.g., a developer of the program 132) or another entity, such as software or a machine.

In some examples, the user 110 can provide the program input file 108 to the client device 112 (such as by downloading or uploading the program input file 108 to the client device 112). The provision of the program input file 108 to the client device 112 can be part of a deployment process in which the user 110 desires to deploy the program 132 in the server system 102, where specific features (e.g., fault tolerance and/or scalability) are made available to the program deployed in the server system 102.

The client device 112 can execute a tool that can supply (at 120) the program input file 108 (or information in the program input file 108) to the program deployment engine 106. In some examples, the tool in the client device 112 includes an infrastructure as code (IaC) tool 114. IaC refers to a process of managing and provisioning information technology (IT) infrastructure that uses machine-readable definition files, such as the program input file 108. The program input file 108 can be in the form of a script or a declarative definition. In some examples, the IaC tool 114 is the Ansible tool, which is an open-source tool. In other examples, other types of IaC tools, or more generally, other types of interface tools can be used in the client device 112 that are able to accept input information relating to a program 132 (e.g., in the form of the program input file 108) to be deployed in the server system 102, and provide the input information to the program deployment engine 106.

In some examples, the program input file 108 can be in a human-readable data-serialization language, such as YAML (Ain't Markup Language). In other examples, the program input file 108 can have a different format, such as according to an Extensible Markup Language (XML), a Hypertext Markup Language (HTML), and so forth.

The program input file 108 (or information in the program input file 108) is provided (at 120) by the IaC tool 114 to the server system 102 over a network (e.g., a local area network (LAN), a wide area network (WAN), the Internet, etc.). In some examples, the program input file 108 (or information in the program input file 108) can be provided by the IaC tool 114 over a secure channel of the network, where the secure channel can be according to a Secure Shell Protocol (SSH), or any other type of secure communication protocol.

The program deployment engine 106 processes the input information in the program input file 108 and performs interactions 116 with one or more of the management subsystems 104-1 to 104-3 to set up the environment 130 for the program 132 to use specific features of the server system 102. Based on output(s) from the management subsystem(s) 104-1 to 104-3, the program deployment engine 106 provides (at 122) output information, such as in the form of Java Script Object Notation (JSON) information or information in a different format, to the IaC tool 114. JSON is a lightweight data-interchange format that humans can read and write. JSON information can also be readable by machines or programs.

Once the output information is received by the IaC tool 114, the output information can be presented to the user 110 through a user interface 124 presented by the client device 112. The user 110 can perform operations with respect to the program 132 executed in the server system 102 using the UI 124. The UI 124 can include a web browser or any other type of UI, such as implemented using the Django REST (Representational State Transfer) Framework, or a JavaScript script, and so forth.

More generally, the output information returned by the program deployment engine 106 can be used by any tool in the client device 112 (or another device).

In examples in which the UI 124 is employed, output information returned by the program deployment engine 106 (e.g., in the JSON format) can be read by code associated with the UI 124 (e.g., a JavaScript script or other code), and the code can display the output information in the UI 124 to the user. In some examples, the output information can include any or some combination of the following: a name of the program 132 to be deployed, a status of deploying the program 132 (e.g., program 132 is running or stopped), configurations details like number of instances of the program 132, and so forth.

Using the output information, the user 110 can control execution of the program 132 in the server system 102. For example, the user 110 can make a selection in the UI 124 to either scale up or scale down the program 132 using control options (e.g., control buttons, input fields, dropdown menus, etc.) in the UI 124. In response to the selection made by the user 110, code of the UI 124 can interact with the program deployment engine 106 to request the scale up or scale down of the program 132. In further examples, the user 110 can use the UI 124 to start, stop, or update the program 132 that has been deployed in the server system 102. In other examples, the user 110 can use the UI 124 to inquire about the status of the program 132 using the UI 124.

Output information (in the JSON format, for example) returned by the program deployment engine 106 to the UI 124 can include a current status of the program 132, so that the user 110 can control the next action to be taken with respect to the program 132.

Figure 2:
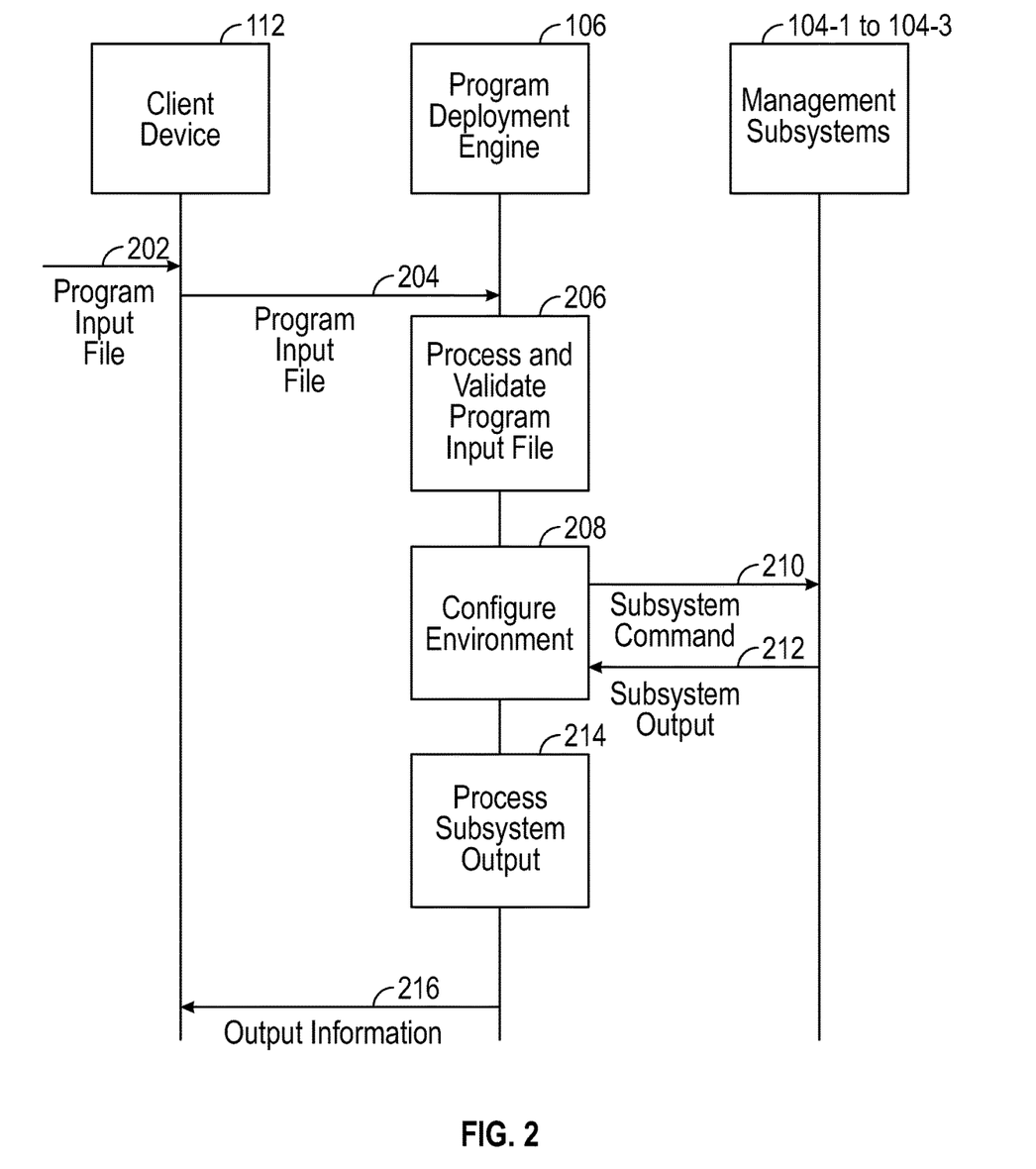
FIG. 2 is a flow diagram of a process according to some examples.

FIG. 2 is a flow diagram of a process that can be performed by components in FIG. 1, including the client device 112, the program deployment engine 106, and the management subsystems 104-1 to 104-3.

The client device 112 receives (at 202) the program input file 108 (e.g., a YAML file) and sends (at 204) the program input file 108 to the program deployment engine 106. The program input file 108 may be received from a user or another requesting entity.

The program input file 108 can include the following information, in some examples: (1) program-specific configuration information, (2) system-specific configuration information, and (3) operational parameters.

Examples of program-specific configuration information can include any or some combination of the following: a port number of a port (e.g., a Transmission Control Protocol or TCP port) at which the program communicates with another entity over a network, a process name of the program, information of logs for the program, identities and locations of dependent programs, and so forth.

Dependent programs are programs that the program 132 to be deployed is to use as part of the execution of the program 132. Examples of dependent programs for a web application (where the web application is an example of the program 132 to be deployed) can include any or some combination of the following: a Java program, a Java Database Connectivity (JDBC) program, a webserver, a Java ARchive (JAR) file, and so forth.

Examples of dependent programs for a Python application can include a Python compiler and Python libraries.

Examples of system-specific configuration information can include any or some combination of the following: fault tolerance is to be provided, a maximum quantity of instances of the program 132, a minimum quantity of instances of the program 132, parameters such as a memory heap size, and so forth.

Examples of operational parameters include any or some combination of the following: an action parameter that specifies an action to be performed, such as configure program, start program, stop program, update program, restart program, obtain status of program, and so forth; a node parameter specifying a computer node on which the action is to be performed, and so forth.

The program deployment engine 106 processes and validates (at 206) the program input file 108.

The various pieces of information in the program input file 108 can be in the form of fields, which can include key-value pairs (where a key represents a property and a value is assigned to the key). The validation performed by the program deployment engine 106 can include checking the syntax of the fields, such as to check the keys for expected key names, and check the values to verify the correct data type or length or range of values.

The processing of the program input file 108 can also include converting data in the format of the program input file 108 into a format that can be read by the management subsystems 104-1 to 104-3 of the server system 102. For example, each management subsystem can implement a command line interface (CLI) and can expect data in the format of the CLI. The conversion can convert data in the format of the program input file 108 (e.g., the YAML format) into CLI data. The CLI data can include CLI commands that are sent to the respective management subsystems 104-1 to 104-3 to set the respective management subsystems 104-1 to 104-3 at respective target states. A target state can include any or some combination of the following: a program is configured, a quantity of instances of the program is running, a scale up or scale down of the program has been performed, the program is started, stopped, or removed, and so forth.

The program deployment engine 106 next configures (at 208) the environment 130 in the server system 102 to support specific features for the program 132. For an example, to configure the program 132 with fault tolerance and scalability, the environment 130 established is a "pathway" environment, which is provided by the management subsystem 104-3. In examples where the program deployment engine 106 includes multiple plugins for the respective management subsystems 104-1 to 104-3, the plugin for the management subsystem 104-3 can be invoked to establish the pathway environment that supports fault tolerance and scalability for the program 132.

The plugin for the management subsystem 104-3 reads the program input file 108 and converts the information in the program input file 108 into the format for the management subsystem 104-3 (task 206 in FIG. 2). The conversion includes constructing a CLI command (or multiple CLI commands) to submit to the management subsystem 104-3. The plugin for the management subsystem 104-3 may be able to access predefined templates for different CLI commands to construct the CLI command(s). The program input file 108 may specify a quantity of instances of the program 132 to execute, which may cause the CLI command(s) to specify this quantity of instances of the program 132.

As part of the configuring (at 208), the plugin for the management subsystem 104-3 can send (at 210) the CLI command(s) to the management subsystem 104-3, such as through a specified application programming interface (API) or another interface. The CLI command(s) cause(s) the management subsystem 104-3 to set up a pathway environment (an example of the environment 130 of FIG. 1), in which the program 132 can execute with fault tolerance and scalability. Fault tolerance is provided using failover, while scalability allows for the quantity of instances of the program 132 to be varied. The pathway environment is the environment set up by the management subsystem 104-3 so that the management subsystem 104-3 can monitor the program 132 to detect for faults to trigger failover (such as between different computer nodes of the server system 102) or to scale up or scale down instances of the program 132, such as in response to a request or in response to detecting increased load (to provide resiliency).

In another example, the program 132 to be deployed is a web application. In such examples, a plugin for another of the management subsystems 104-1 to 104-3 can process the program input file 108 and send the appropriate CLI command(s) to the other management subsystem, which can create a web environment (another example of the environment 130) in which the web application can be installed, configured, and started, based on web server configuration fields in the program input file 108, for example.

As noted above, the program input file 108 includes operational parameters, which can include an action parameter specifying an action to be performed, such as configure program, start program, stop program, update program, restart program, etc. Based on the action parameter, the program deployment engine 106 can cause the program 132 to be deployed in the environment 130 with the action specified by the action parameter, e.g., the program 132 is started or stopped, the program 132 is updated, the program 132 is restarted, the program 132 is configured, and so forth.

As further noted above, the program input file 108 includes program-specific configuration information. The program deployment engine 106 can use the program-specific configuration information when deploying the program 132, such as setting up a port number at which the program communicates with another entity over a network, a process name of the program 132, information of logs for the program 132, and loading dependent programs for the program 132 based on the identities and locations of the dependent programs in the program input file 108.

The program deployment engine 106 can also use the system-specific configuration information in the program input file 108 when deploying the program 132, such as running a quantity of instances of the program 132, setting up a memory heap according to the memory heap size in the system-specific configuration information, setting up fault tolerance, and so forth.

In response to the CLI command(s) sent at 210, the management subsystem can respond by sending (at 212) subsystem output information to the program deployment engine 106 (e.g., to the plugin that sent the CLI command(s)).

In some examples, the subsystem output information can include any or some combination of the following: a name of the program 132 to be deployed, a status of deploying the program 132 (e.g., program 132 is running or stopped), configurations details like number of instances of the program 132, and so forth.

The program deployment engine 106 processes (at 214) the subsystem output information, which can include converting the subsystem output information to a specified format, e.g., JSON format.

The program deployment engine 106 sends (at 216) output information produced by the processing at 214 to the client device 112.

As discussed above, the output information received by the client device 112 can be displayed to the user 110 in the UI 124, which can accept user inputs to control operations of the program 132 deployed in the server system 102.

In some examples of the present disclosure, a legacy program can be deployed in a server system with fault tolerance and/or scalability without specific knowledge of details of the server system that support such features. A developer of the legacy program can focus on the program rather than having to learn the details of the server system. The program deployment engine 106 is able to receive various input information and can automatically interact with management subsystems in the server system to support the specific features desired for the legacy program.

Figure 3:
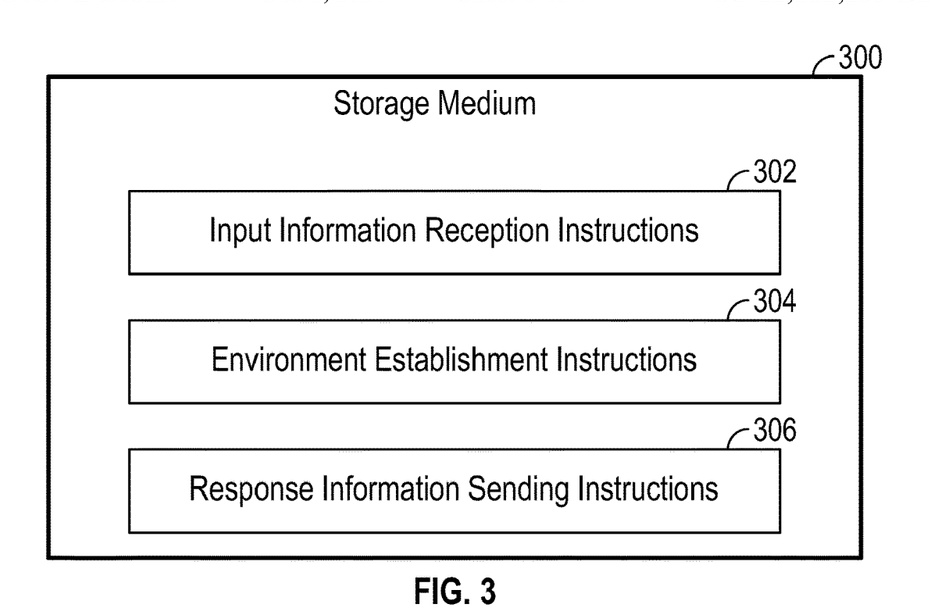
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system (e.g., the server system 102 or another system) to perform various tasks.

The machine-readable instructions include input information reception instructions 302 to receive, from a requesting entity (e.g., the user 110, the client device 112, etc.), input information relating to a program to be deployed on a server system. For example, the input information can include the program input file 108 of FIG. 1.

The machine-readable instructions include environment establishment instructions 304 to establish, based on the input information, an environment in the server system, where the environment is based on interaction with a subsystem of the server system, the subsystem of the server system to support one or more of fault tolerance for the program or scalability of the program in the server system.

In some examples, the machine-readable instructions are to generate a command and send the command to the subsystem to establish the environment based on the input information. The command can include a CLI command, for example.

The machine-readable instructions include response information sending instructions 306 to, after establishing the environment of the subsystem of the server system, send response information to the requesting entity, the response information useable by the requesting entity to manage the program when executed in the server system.

In some examples, the input information specifies a quantity of instances of the program to run in the server system, and the machine-readable instructions can deploy a quantity of instances of the program in the environment according to the input information.

In some examples, the input information specifies an action to be performed for the program, and the machine-readable instructions can deploy the program in the environment according to the action (start, stop, etc.) specified by the input information.

In some examples, the machine-readable instructions can identify, based on the input information, dependent programs for the program, and load the dependent programs.

In some examples, the response information is presentable in a user interface, and the user interface is accessible to cause control of the program in the server system.

Figure 4:
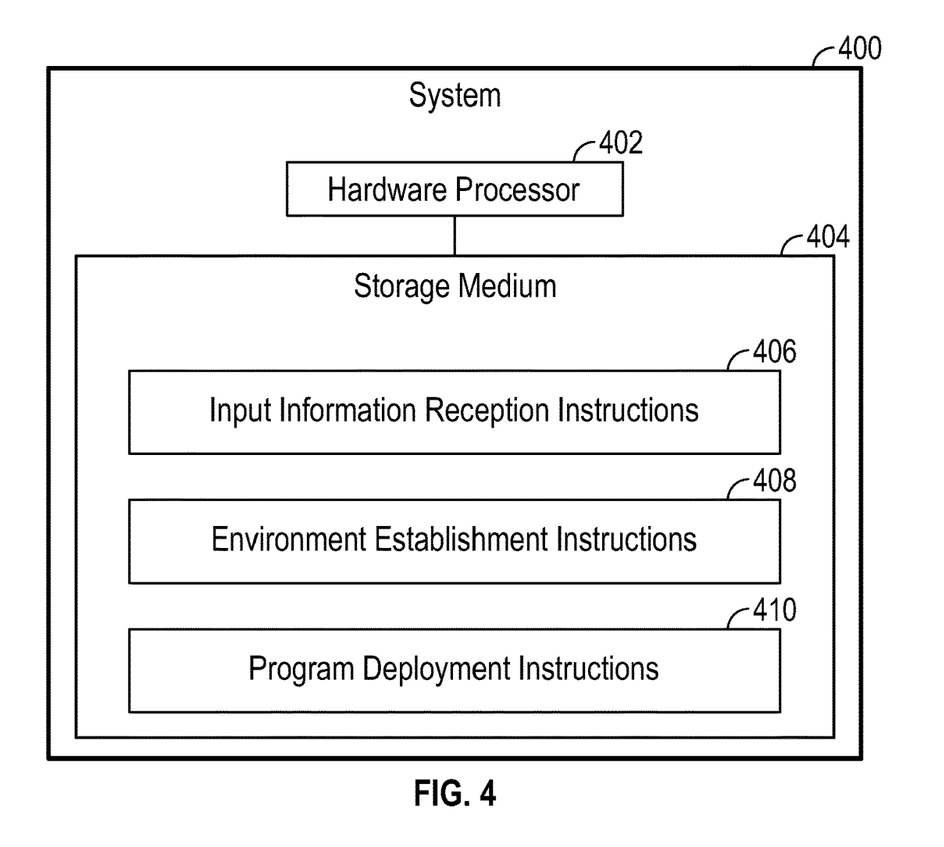
FIG. 4 is a block diagram of a system according to some examples.

FIG. 4 is a block diagram of a system 400 according to some examples of the present disclosure. The system 400 can be implemented with a computer or multiple computers.

The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform various tasks.

Machine-readable instructions executable on a hardware processor can refer to the instructions executable on a single hardware processor or the instructions executable on multiple hardware processors.

The machine-readable instructions in the storage medium 404 include input information reception instructions 406 to receive, from a requesting entity, input information relating to a program to be deployed on a server system. The input information can include program-specific configuration information, system-specific configuration information, and operational parameters.

The machine-readable instructions in the storage medium 404 include environment establishment instructions 408 to establish, based on the input information, an environment in the server system. The environment establishment is based on interaction with a subsystem of the server system, where the subsystem of the server system supports one or more of fault tolerance for the program or scalability of the program in the server system.

The machine-readable instructions in the storage medium 404 include program deployment instructions 410 to, after establishing the environment of the subsystem of the server system, deploy the program in the environment.

In some examples, the machine-readable instructions can deploy the program in the environment according to the program-specific configuration information, or the system-specific configuration information, or the operational parameters.

Figure 5:
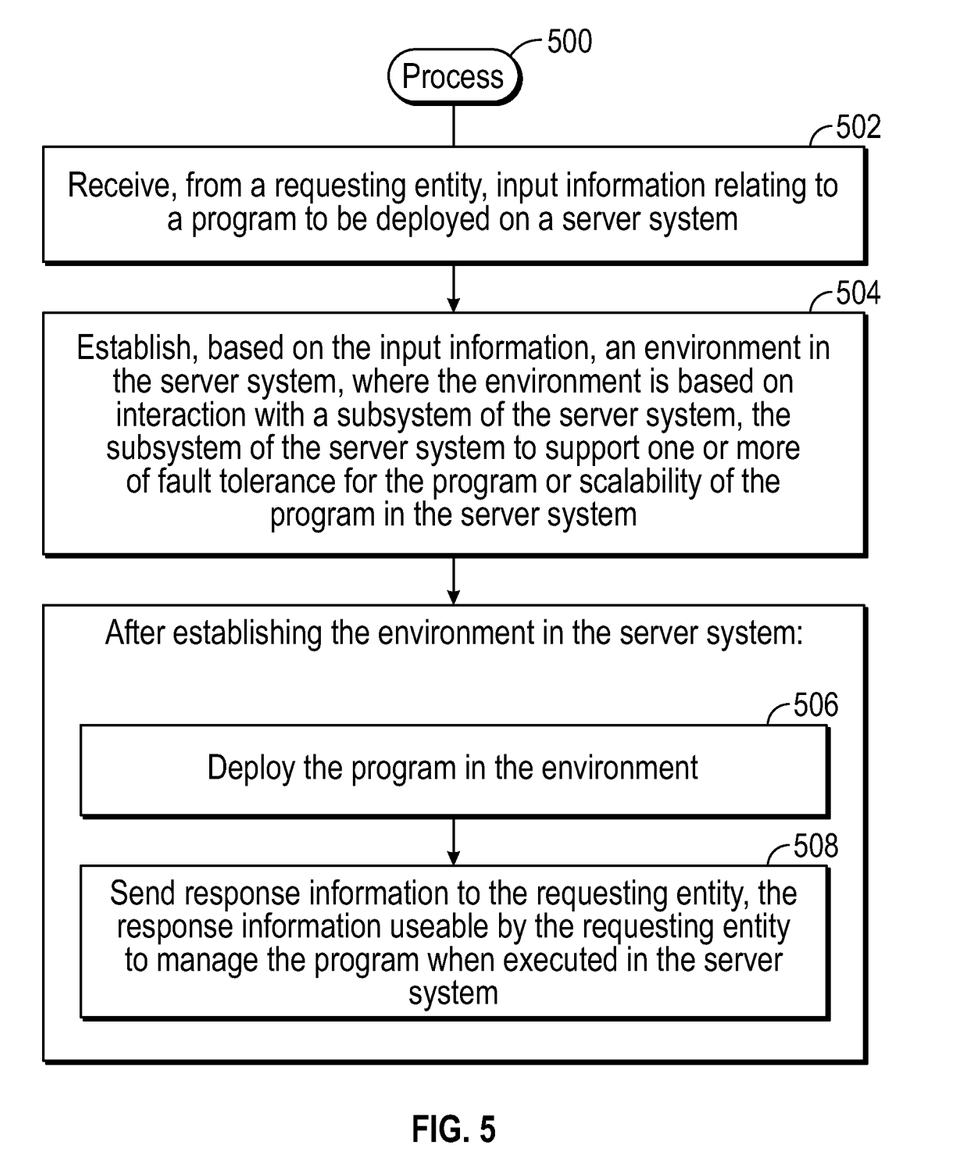
FIG. 5 is a flow diagram of a process according to some examples.

FIG. 5 is a flow diagram of a process 500 according to some examples. The process 500 can be performed by the program deployment engine 106, for example.

The process 500 receives (at 502), from a requesting entity, input information relating to a program to be deployed on a server system. The input information can include the program input file 108 of FIG. 1, for example.

The process 500 establishes (at 504), based on the input information, an environment in the server system, where the environment is based on interaction with a subsystem of the server system, the subsystem of the server system to support one or more of fault tolerance for the program or scalability of the program in the server system.

After establishing the environment in the server system, the process 500 deploys (at 506) the program in the environment, and sends (at 508) response information to the requesting entity, the response information useable by the requesting entity to manage the program when executed in the server system. The program is deployed in the environment with fault tolerance and/or scalability supported, such as managed by the subsystem.

For example, the response information can be presented in a UI, and a user can use the UI to affect an operation of the program deployed in the server system.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
  receive, from a requesting entity, a program input file for a program to be deployed on a server system, the program input file comprising a plurality of parameters, the plurality of parameters comprising a first parameter specifying a provision of fault tolerance for the program, a second parameter specifying a size of a memory heap for the program, a third parameter referring to a dependent program to be used by the program, the dependent program comprising a compiler, and a fourth parameter specifying an update or a restart of the program;
  establish an environment in the server system by sending commands based on the program input file to the server system, wherein the establishing of the environment configures the program with the fault tolerance based on the first parameter, sets up the memory heap for the program according to the size specified by the second parameter, loads the compiler referred to by the third parameter, and updates or restarts the program according to the fourth parameter;
  monitor, by a subsystem of the server system, an operation of the program in the environment;
  in response to detecting a fault of the program, trigger, by the subsystem, failover of the program from a first computer node of the server system to a second computer node of the server system to provide the fault tolerance for the program; and
  after establishing the environment in the server system, send response information to the requesting entity, the response information useable by the requesting entity to manage the program when executed in the server system.

2. The non-transitory machine-readable storage medium of claim 1, wherein the program input file comprises a port parameter specifying a port number of a port, and wherein the instructions upon execution cause the system to:
  deploy the program in the environment, wherein the program communicates with another entity over a network using the port having the port number specified by the port parameter.

3. The non-transitory machine-readable storage medium of claim 1, wherein the receiving of the program input file and the establishing of the environment in the server system are performed by a program deployment engine in the server system.

4. The non-transitory machine-readable storage medium of claim 1, wherein the program input file comprises a further parameter specifying a quantity of instances of the program to run in the server system, and wherein the instructions upon execution cause the system to:

deploy the quantity of instances of the program in the environment according to the further parameter input information.

5. The non-transitory machine-readable storage medium of claim 4, wherein the quantity of instances of the program specified by the further parameter is a maximum quantity of instances of the program or a minimum quantity of instances of the program.

6. The non-transitory machine-readable storage medium of claim 1, wherein the instructions upon execution cause the system to:
scale up or scale down a quantity of instances of the program in the server system based on a load in the server system.

7. The non-transitory machine-readable storage medium of claim 1, wherein the instructions upon execution cause the system to:
deploy the program in the server system using program-specific information in the program input file.

8. The non-transitory machine-readable storage medium of claim 7, wherein the program-specific information comprises a process name of the program and location information of a log for the program.

9. The non-transitory machine-readable storage medium of claim 1, wherein the instructions upon execution cause the system to:
convert data in the program input file to a format for the subsystem.

10. The non-transitory machine-readable storage medium of claim 9, wherein the format for the subsystem is according to a command line interface format.

11. The non-transitory machine-readable storage medium of claim 1, wherein the response information is presentable in a user interface, and wherein the instructions upon execution cause the system to:
receive, from the user interface, an input controlling the program in the server system.

12. A server system comprising:
a subsystem;
a processor; and
a non-transitory storage medium storing instructions executable on the processor to:
receive, from a requesting entity, a program input file for a program to be deployed on the server system, the program input file comprising a plurality of parameters, the plurality of parameters comprising a first parameter specifying a provision of fault tolerance for the program, a second parameter specifying a size of a memory heap for the program, a third parameter referring to a dependent program to be used by the program, the dependent program comprising a compiler, and a fourth parameter specifying an update or a restart of the program;
establish an environment in the server system by sending commands based on the program input file to the subsystem of the server system, wherein the establishing of the environment configures the program with the fault tolerance based on the first parameter, sets up the memory heap for the program according to the size specified by the second parameter, loads the compiler referred to by the third parameter, and updates or restarts the program according to the fourth parameter; and
after establishing the environment in the server system, deploy the program in a first computer node of the server system;
wherein the subsystem is configured to:
monitor an operation of the program in the first computer node; and
in response to detecting a fault of the program, trigger failover of the program from the first computer node of the server system to a second computer node of the server system to provide the fault tolerance for the program.

13. The server system of claim 12, wherein the program input file comprises a port parameter specifying a port number of a port, and wherein the program communicates with another entity over a network using the port having the port number specified by the port parameter.

14. The server system of claim 12, wherein the program input file comprises a further parameter specifying a quantity of instances of the program to run in the server system, and wherein the instructions are executable on the processor to:
deploy the quantity of instances of the program in the environment according to the further parameter.

15. The server system of claim 14, wherein the quantity of instances of the program specified by the further parameter is a maximum quantity of instances of the program or a minimum quantity of instances of the program.

16. The server system of claim 12, wherein the program input file comprises system-specific configuration information, and the instructions are executable on the processor to:
deploy the program in the environment according to the system-specific configuration information, the system-specific configuration information comprising location information of a log for the program.

17. The server system of claim 12, wherein the instructions are executable on the processor to:
after establishing the environment in the server system, send response information to the requesting entity, the response information presentable in a user interface; and
receive, from the user interface, an input controlling the program in the server system.

18. A method of a system comprising a hardware processor, comprising:
receiving, from a requesting entity, a program input file for a program to be deployed on a server system, the program input file comprising a plurality of parameters, the plurality of parameters comprising a first parameter specifying a provision of fault tolerance for the program, a second parameter specifying a size of a memory heap for the program, a third parameter referring to a dependent program to be used by the program, the dependent program comprising a compiler, and a fourth parameter specifying an update or a restart of the program;
establishing an environment in the server system by sending commands based on the program input file to a subsystem of the server system, wherein the establishing of the environment configures the program with the fault tolerance based on the first parameter, sets up the memory heap for the program according to the size specified by the second parameter, loads the compiler referred to by the third parameter, and updates or restarts the program according to the fourth parameter; and
after establishing the environment in the server system:
deploying the program in the environment,
sending response information to the requesting entity,
monitoring, by the subsystem, an operation of the program in the environment, and in response to detecting a fault of the program, triggering failover of the program from a first computer node of the server system to a second computer node of the server system to provide the fault tolerance for the program.

19. The method of claim 18, wherein the program input file comprises a port parameter specifying a port number of a port, and wherein the program communicates with another entity over a network using the port having the port number specified by the port parameter.

\* \* \* \* \*